(12) United States Patent
Zhu et al.

(10) Patent No.: US 9,350,835 B2
(45) Date of Patent: May 24, 2016

(54) MOBILE WIRELESS COMMUNICATIONS DEVICE WITH IMPROVED BROADBAND ANTENNA IMPEDANCE MATCHING

(71) Applicant: BLACKBERRY LIMITED, Waterloo (CA)

(72) Inventors: Lizhong Zhu, Waterloo (CA); Michael Stephen Corrigan, Waterloo (CA); Rafaele Pini, Park Ridge, IL (US)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 14/338,974

(22) Filed: Jul. 23, 2014

(65) Prior Publication Data

US 2016/0028863 A1 Jan. 28, 2016

(51) Int. Cl.
*H04M 1/00* (2006.01)
*H04B 1/38* (2015.01)
*H04M 1/02* (2006.01)

(52) U.S. Cl.
CPC ..................................... *H04M 1/026* (2013.01)

(58) Field of Classification Search
CPC ............ H04B 1/40; H04B 1/04; H04B 1/005; H04M 1/6041
USPC ............ 455/90.3, 552.1, 553.1, 575.1, 575.5, 455/575.7
See application file for complete search history.

(56) References Cited

U.S. PATENT DOCUMENTS

| 2,260,164 | A | | 10/1941 | Brown et al. |
| 2,855,508 | A | * | 10/1958 | Barlow .................... H04B 1/04 330/185 |
| 4,468,644 | A | | 8/1984 | Teague et al. |
| 7,761,115 | B2 | * | 7/2010 | Castaneda ............ H01Q 1/2266 343/702 |
| 7,944,305 | B2 | | 5/2011 | Knickerbocker et al. |
| 8,639,194 | B2 | * | 1/2014 | Asrani .................... H01Q 1/243 455/552.1 |
| 2004/0032302 | A1 | | 2/2004 | Chominski |
| 2004/0116799 | A1 | | 6/2004 | Srinivasan |
| 2006/0223570 | A1 | | 10/2006 | Zhu et al. |
| 2006/0223597 | A1 | | 10/2006 | Zhu et al. |
| 2009/0061966 | A1 | * | 3/2009 | Yang ...................... H01Q 1/243 455/575.7 |
| 2010/0137019 | A1 | | 6/2010 | Pedersen |
| 2014/0187178 | A1 | | 7/2014 | Yang et al. |

OTHER PUBLICATIONS

Extended European Search Report dated Dec. 23, 2015 for European Patent Application No. 15178050.9.

\* cited by examiner

*Primary Examiner* — Quochien B Vuong
(74) *Attorney, Agent, or Firm* — Perry + Currier, Inc.

(57) ABSTRACT

A mobile electronic device is provided. In one aspect, the mobile electronic device comprises a chassis including a ground plane; a processor carried by the chassis; a frequency tunable antenna carried by the chassis and fed by an inductor; a communications interface carried by the chassis and operative with the processor for receiving and transmitting RF signals via the frequency tunable antenna; audio circuitry carried by the chassis and operative with the communications interface and processor; an audio transducer having a coil in proximity to the frequency tunable antenna for at least one of receiving and transmitting audio signals from and to the audio circuitry; and at least one RF choke configured for blocking RF energy from the frequency tunable antenna through the audio transducer to the ground plane and decoupling the antenna from the audio transducer to minimize any detuning of antenna impedance match and degradation in antenna gain. At least one tunable capacitor is connected in parallel with at least one of the audio transducer coil, the RF choke and the inductor, for providing dynamic RF energy blocking over an operating frequency range of the frequency tunable antenna.

20 Claims, 4 Drawing Sheets

ME WIRELESS COMMUNICATIONS DEVICE WITH IMPROVED BROADBAND ANTENNA IMPEDANCE MATCHING

FIELD

The specification relates generally to the field of communications devices, and more particularly, to a method and apparatus for dynamic radio frequency (RF) tuning of electronic components in close proximity to a broadband antenna.

BACKGROUND

Current mobile electronic devices, such as smart phones, tablets and the like, incorporate one or more antennas for receiving and transmitting high-speed data. Due to the small size of such devices and high density of components on the device circuit board, interference can occur between the antenna(s) and other electronic components in close proximity thereto. For example, problems can occur when the antenna impedance match is detuned and antenna gain is degraded by the coupling of an audio transducer such as a speaker with an adjacent antenna.

It is known in the art to improve antenna performance of mobile wireless communications devices by blocking RF current from being coupled to the ground plane of a printed circuit board on which the antenna(s) and adjacent electronic components are mounted. One example of such a prior art solution is set forth in commonly-owned U.S. Pat. No. 7,483,727 entitled MOBILE WIRELESS COMMUNICATIONS DEVICE HAVING IMPROVED ANTENNA IMPEDANCE MATCH AND ANTENNA GAIN FROM RF ENERGY, issued Jan. 27, 2009, the contents of which are incorporated herein by reference.

According to the solution set forth in U.S. Pat. No. 7,483,727, the choking frequency is fixed and covers a narrow frequency band around the self-resonating frequency of the RF choke. However, modern day broadband mobile communications devices generally have different antennas implemented to support different types of wireless protocols and/or to cover different frequency ranges. For example, LTE (Long Term Evolution) bands, GSM (Global System for Mobile Communications) bands, UMTS (Universal Mobile Telecommunications System) bands, and/or WLAN (wireless local area network) bands, cover frequency ranges from 700 to 960 MHz, 1710-2170 MHz, and 2500-2700 MHz and the specific channels within these bands can vary from region to region necessitating the use of different antennas for each region in similar models of devices. It is desirable to improve antenna performance, for example in the LTE B7 range (i.e. 2500-2700 MHz).

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
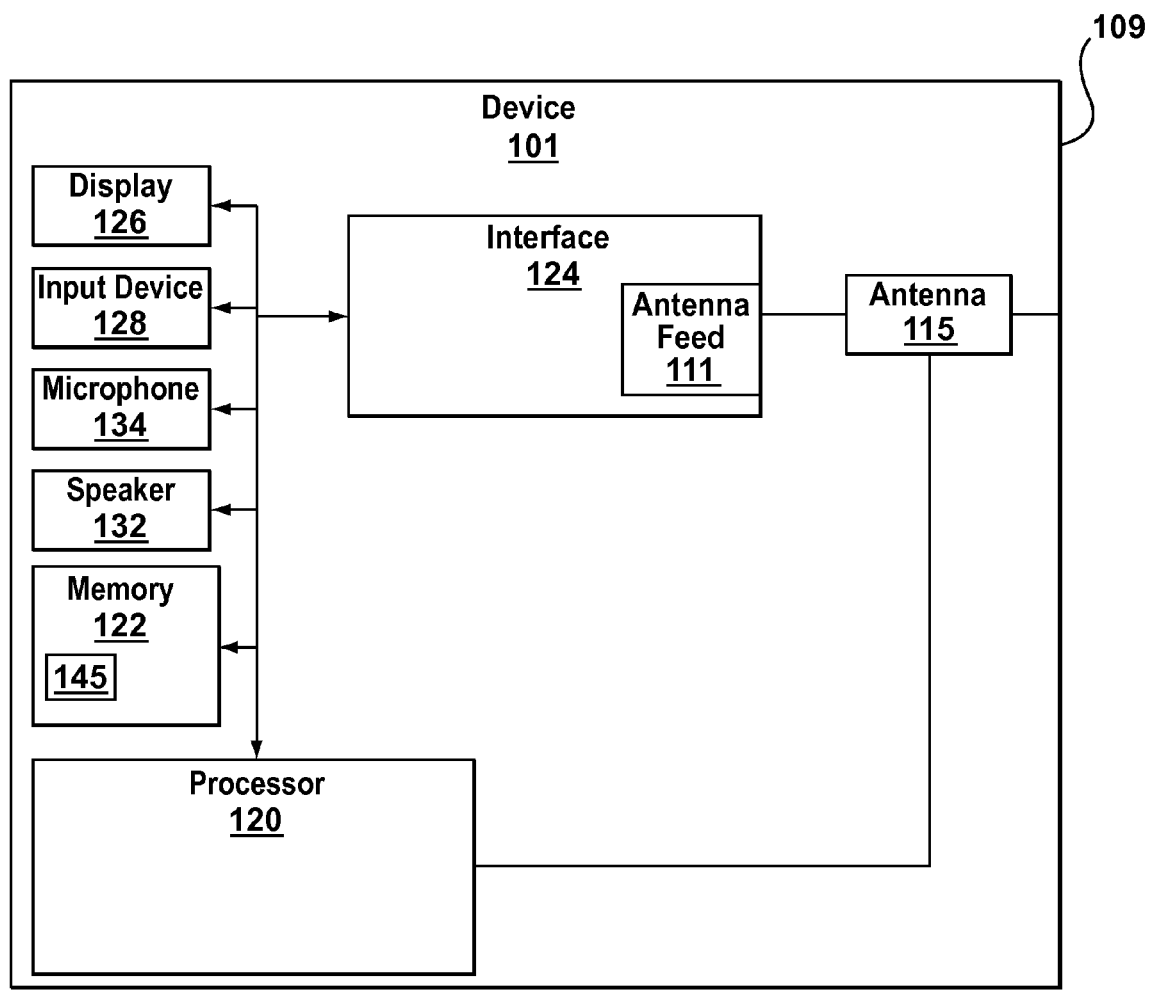
FIG. 1 depicts a schematic diagram of a device that includes a frequency tunable antenna, according to the prior art.

The present disclosure describes examples of an RF choke circuit for providing improved antenna impedance match and broadband antenna gain for LTE bands, GSM bands, UMTS bands, and/or WLAN bands in a plurality of geographical regions. In one aspect, the resonant frequency of the RF choke can be precisely tuned.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

An aspect of the specification provides a mobile electronic device comprising: a chassis including a ground plane; a processor carried by the chassis; a frequency tunable antenna carried by the chassis and fed by an inductor; a communications interface carried by the chassis and operative with the processor for receiving and transmitting RF signals via the frequency tunable antenna; audio circuitry carried by the chassis and operative with the communications interface and processor; an audio transducer having a coil in proximity to the frequency tunable antenna for at least one of receiving and transmitting audio signals from and to the audio circuitry; at least one RF choke configured for blocking RF energy from the frequency tunable antenna through the audio transducer to the ground plane and decoupling the antenna from the audio transducer to minimize any detuning of antenna impedance match and degradation in antenna gain; and at least one tunable capacitor connected in parallel with at least one of the audio transducer coil, the RF choke and the inductor, for providing dynamic RF energy blocking over an operating frequency range of the frequency tunable antenna.

The at least one tunable capacitor can be a passive tunable integrated circuit whose capacitance is controlled by the communications interface under control of the processor based on the operating frequency range of the frequency tunable antenna.

The at least one tunable capacitor can be connected in parallel with the audio transducer coil for tuning the coil so that it does not resonate at RF frequencies, thereby reducing RF energy coupled to the audio transducer.

A first tunable capacitor can be connected in parallel with a first RF choke forming a first tank circuit in series with the audio transducer, and a second tunable capacitor can be connected in parallel with a second RF choke forming a second tank circuit in series with the audio transducer.

The first and second tunable capacitors can be tuned to the same capacitance so that the self-resonating frequencies of the first and second tank circuits are the same, for optimal performance in a selected frequency range of the frequency tunable antenna.

The mobile electronic device can further include an auxiliary antenna for receiving and transmitting RF signals using carrier aggregation, and wherein the first and second tunable capacitors are each tuned to a different capacitance so that the self-resonating frequencies of the first and second tank circuits match self-resonant frequencies of the frequency tunable antenna and the auxiliary antenna operating in different frequency bands.

A first tunable capacitor can be connected in parallel with the audio transducer coil, a tunable capacitor can be connected in parallel with a first RF choke forming a first tank circuit in series with the audio transducer, and a third tunable capacitor can be connected in parallel with a second RF choke forming a second tank circuit in series with the audio transducer.

The audio transducer can be a speaker.

The at least one RF choke can be an 85 nH inductor in series with the audio transducer and the at least one tunable capacitor can be tuned to 3 pF and connected in parallel with the at least one RF choke, resulting in a return-loss for the frequency tunable antenna characterized by approximately −13.54 dB at around 2 GHz, −10.3 dB around 762.8 MHz and −6.29 dB around 1.117 GHz.

The at least one RF choke can be an 85 nH inductor in series with the audio transducer and the at least one tunable capacitor can be tuned to at least 30 pF and connected in parallel with the at least one RF choke, resulting in a return-loss for the frequency tunable antenna characterized by approximately −32.74 dB at around 2 GHz, −11.33 dB around 757.4 MHz and −6.84 dB around 1.146 GHz.

The audio circuitry can be a Class-D audio amplifier.

The mobile electronic device can further include a pair of RF bypass capacitors connected to the outputs of the Class-D audio amplifier for reducing digital noise and harmonics in the audio signals.

The mobile electronic device can further include a pair of ESD diodes connected to the outputs of the Class-D audio amplifier for protecting the Class-D audio amplifier from being damaged by electrostatic discharge.

A further aspect of the specification sets forth a method of operating the mobile electronic device as set forth above, comprising tuning the first, second and third tunable capacitor to reduce RF transmission harmonics while optimizing transmission power.

An additional aspect of the specification sets forth a method of operating the mobile electronic device as set forth above, comprising tuning the first, second and third tunable capacitor to block digital noise and harmonics in the audio signals from reaching the audio transducer and from being coupled to the frequency tunable antenna.

An additional aspect of the specification sets forth a method of operating the mobile electronic device as set forth above, comprising tuning the at least one tunable capacitor for filtering RF energy at around 2 GHz.

FIG. 1 depicts a schematic diagram of a mobile electronic device 101, referred to interchangeably hereafter as device 101, according to the prior art. Device 101 comprises: a chassis 109 comprising a ground plane; an antenna feed 111, and a frequency tunable antenna 115 connected to the antenna feed 111, described in further detail below. Frequency tunable antenna 115 will be interchangeably referred to hereafter as antenna 115. Device 101 can be any type of electronic device that can be used in a self-contained manner to communicate with one or more communication networks using antenna 115. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cell phones, smart phones, e-readers, internet-enabled appliances and the like. Other suitable devices are within the scope of present implementations. Device 101 hence further comprise a processor 120, a memory 122, a display 126, a communication interface 124 that can optionally comprise antenna feed 111, at least one input device 128, a speaker 132 and a microphone 134. Processor 120 is also in communication with one or more switches of antenna 115, as described in further detail below.

It should be emphasized that the structure of device 101 in FIG. 1 is purely an example, and contemplates a device that can be used for both wireless voice (e.g. telephony) and wireless data communications (e.g. email, web browsing, text, and the like). However, FIG. 1 contemplates a device that can be used for any suitable specialized functions, including, but not limited, to one or more of, telephony, computing, appliance, and/or entertainment related functions.

Device 101 comprises at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 145 that, when processed by processor 120, enables processor 120 to: communicate with one or more switches at antenna 115 to select one or more inductors for tuning at least one resonance of antenna 115. Memory 122 storing application 145 is an example of a computer program product, comprising a nontransitory computer usable medium having a computer readable program code adapted to be executed to implement a method, for example a method stored in application 145.

Processor 120 can be further configured to communicate with display 126, and microphone 134 and speaker 132. Display 126 comprises any suitable one of, or combination of, CRT (cathode ray tube) and/or flat panel displays (e.g. LCD (liquid crystal display), plasma, OLED (organic light emitting diode), capacitive or resistive touch screens, and the like). Microphone 134, comprises any suitable microphone for receiving sound and converting to audio data. In some implementations, input device 128 and display 126 are external to device 101, with processor 120 in communication with each of input device 128 and display 126 via a suitable connection and/or link.

Speaker 132 comprises any suitable speaker for converting audio data to sound to provide one or more of audible alerts, audible communications from remote communication devices, and the like. As discussed in greater detail below, audio signals can be amplified by an amplifier (not shown in FIG. 1) for application to speaker 132.

Processor 120 also connects to communication interface 124 (interchangeably referred to as interface 124), which can be implemented as one or more radios and/or connectors and/or network adaptors, configured to wirelessly communicate with one or more communication networks (not depicted) via antenna 115. It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WLAN (wireless local area network) links, WiFi links, WiMax links, packet based links, the Internet, analog networks, the PSTN (public switched telephone network), access points, and the like, and/or a combination.

Specifically, interface 124 comprises radio equipment (i.e. a radio transmitter and/or radio receiver) for receiving and transmitting signals using antenna 115. It is further appreciated that, as depicted, interface 124 comprises antenna feed 111, which alternatively can be separate from interface 124.

It is yet further appreciated that device 101 comprises a power source, not depicted in FIG. 1, for example a battery or the like. In some implementations the power source can comprise a connection to a mains power supply and a power adaptor (e.g. and AC-to-DC (alternating current to direct current) adaptor).

It is yet further appreciated that device 101 also comprises an outer housing that houses components of device 101, including chassis 109. Chassis 109 can be internal to the outer housing and be configured to provide structural integrity to device 101. Chassis 109 can be further configured to support components of device 101 attached thereto, for example, display 126. In specific implementations chassis 109 can comprise one or more of a conducting material and a conducting metal, such that chassis 109 forms a ground and/or a ground plane of device 101; in alternative implementations, at least a portion of chassis 109 can comprise one or more of a conductive covering and a conductive coating which forms the ground plane.

In any event, it should be understood that a wide variety of configurations for device 101 are contemplated.

It is further appreciated that antenna 115 can comprise a wide variety of configurations. For example, one non-limiting implementation of antenna 115 is set forth in U.S. patent application Ser. No. 13/922,355, filed Jun. 20, 2013, the contents of which are incorporated herein by reference.

Figure 2:
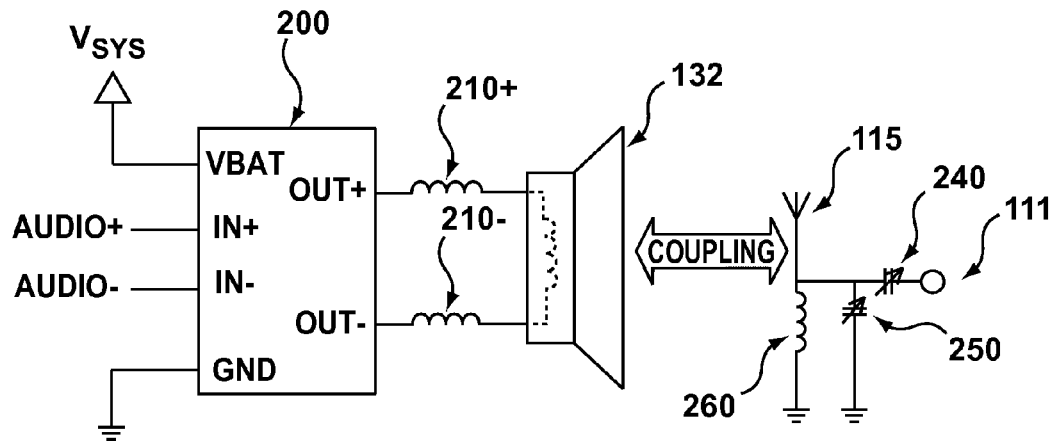
FIG. 2 depicts a schematic diagram of a prior art RF choke circuit for providing improved antenna impedance match and antenna gain.

Turning now to FIG. 2, a prior art RF choke circuit is depicted for providing improved antenna impedance match and antenna gain, as set forth in commonly-owned U.S. Pat. No. 7,483,727.

An audio amplifier 200 amplifies AUDIO+ and AUDIO− signals (e.g. voice signals, notification signals, etc., from processor 120). The amplified differential audio output (OUT+ and OUT−) of the amplifier 200 is applied to the inputs of speaker 132, via RF chokes 210+ and 210− to the loud speaker.

As is well known in the art, a choke is an inductor used to block high-frequency alternating current (AC) in an electrical circuit, while allowing lower frequency or DC current to pass. The low electrical resistance of the inductor allows both AC and DC to pass with little power loss, but limits the amount of AC signal passing through as a function of frequency due to its reactance. The impedance ($Z_L$) of each RF choke 210+ and 210− increases with frequency according to the equation $Z_L=j\omega L$, where $\omega$ is frequency and L is inductance. Preferably, each RF choke 210+ and 210− is selected to have its self-resonating frequency in the middle of frequency band of the RF energy to be choked.

By properly selecting the RF chokes 210+ and 210− as described above, RF energy is prevented from being leaked to ground via the speaker 132 from antenna 115. In essence, RF chokes 210+ and 210− function to shunt RF energy from the antenna to ground. In one implementation, each RF choke comprises an 85 nH inductor with self-resonance around 1.5 GHz, such that the return-loss response of the antenna, which is coupled closely with the speaker 132 is characterized by an approximately −10.72 dB at around 2 GHz (marker 3 in FIG. 3), as well as approximately −9.94 dB and −9.83 dB return losses at around 777.2 MHz and 1.11 GHz, (markers 1 and 2, respectively, in FIG. 3).

As discussed above, antenna 115 is preferably a broadband antenna capable of operation in multiple RF bands (low, medium and high). This is effected by tuning capacitors 240 and 250. Because antenna 115 is positioned close to the user's head during operation of the mobile electronic device 101, inductor 260 is located close to the antenna for electrostatic discharge (ESD) grounding.

Figure 3:
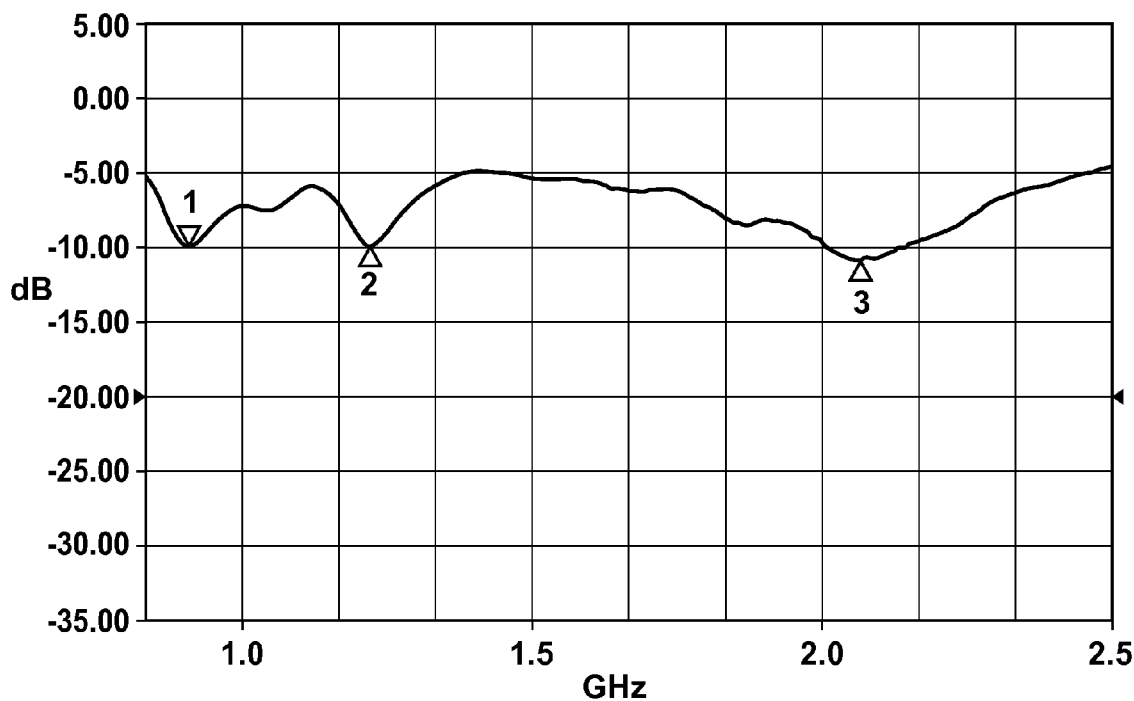
FIG. 3 depicts a return-loss curve of the prior art RF choke circuit of FIG. 2, with an 85 nH inductor.

In the prior art configuration of FIG. 2, the choking frequency established by inductors 210− and 210+ is fixed and only covers a narrow frequency band around the self-resonating frequency (e.g. the approximately −10.72 dB return loss at around 2 GHz in the exemplary return-loss diagram of FIG. 3). However, it is desirable that the coupling between antenna 115 and speaker 132 be controlled for broadband antenna design, which can cover a broadband frequency range from 700 MHz to 2.7 GHz.

Figure 4:
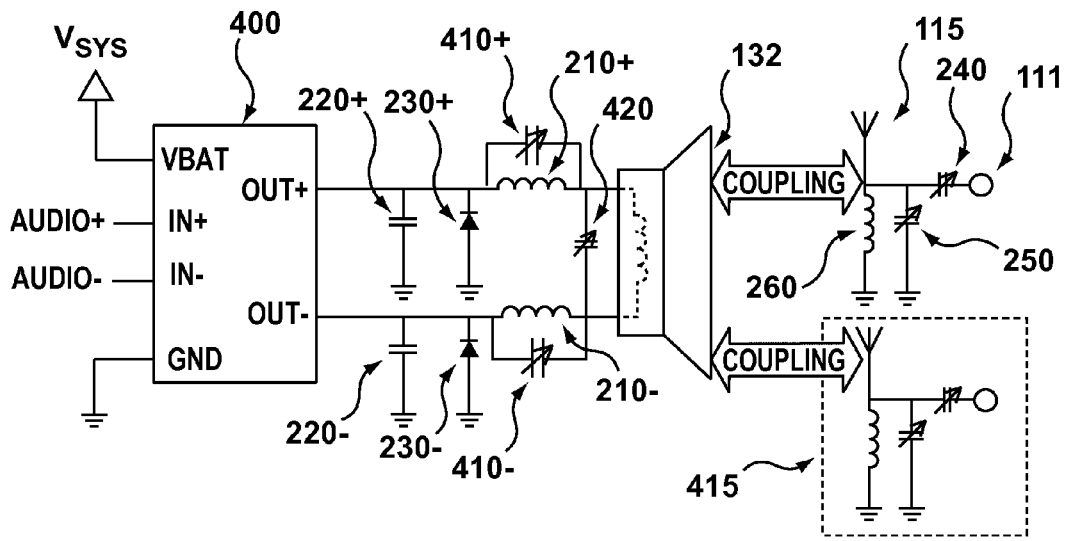
FIG. 4 depicts a schematic diagram of a tunable RF choke circuit for providing improved antenna impedance match and broadband antenna gain, according to a non-limiting implementation.

FIG. 4 is a schematic diagram of a tunable RF choke circuit for providing improved antenna impedance match and broadband antenna gain, according to non-limiting implementations.

Audio amplifier 400 amplifies AUDIO+ and AUDIO− signals from processor 120. In one embodiment, amplifier 400 is a class-D amplifier (or switching amplifier) in which the amplifying devices (transistors, usually MOSFETs) operate as electronic switches. The major advantage of a class-D amplifier is that it can be more efficient than analog amplifiers, with less power dissipated as heat in the active devices.

RF bypass capacitors 220+ and 220− are provided for reducing digital noise and harmonics in the RF bands of the Class-D digital audio signals.

Diodes 230− and 230+ are ESD (electrostatic discharge) diodes to protect the Class-D audio amplifier 400 from being damaged.

In addition to the RF chokes 210− and 210+ depicted in FIG. 2, the circuit of FIG. 4 includes one or more tunable capacitors: 410−, 410+ and/or 420 for providing dynamic RF energy choking over a wide frequency range. In one non-limiting embodiment, 410−, 410+ and 420 are passive tunable integrated circuits (PTICs), for example as manufactured by Paratek Microwave Inc. A PTIC has the ability to change capacitance upon a change in voltage. In the implementation of FIG. 4, the capacitance tuning voltage is provided by the interface 124 under control of processor 120.

As discussed in greater detail below, tunable capacitors 410−, 410+ and 420 can be used either separately or jointly to choke RF energy from being lost, due to heavy coupling between antenna 115 and speaker 132.

Capacitor 420 can be used to tune the loudspeaker coil of speaker 132 so that it does not resonate at RF frequencies, thereby increasing the equivalent loading impedance at the self-resonating frequency and reducing the RF energy absorbed by the loudspeaker.

Tunable capacitors 410− and 410+ are connected in parallel with chokes 210− and 210+, respectively. Both of capacitors 410− and 410+ can be adjusted so that the self-resonating frequencies of the parallel-resonating tank circuits comprising choke 201−/capacitor 410− and choke 201+/capacitor 410+ are the same, for optimal antenna efficiency when operating in a specific frequency band. Alternatively, for a device 101 using carrier aggregation over different frequency bands, capacitors 410− and 410+ can be tuned to make the resonating frequencies of both tank circuits either different or the same to match the self-resonant frequencies of respective main and auxiliary antennas operating in different frequency bands (FIG. 4 shows an optional auxiliary antenna 415). It should be noted that each antenna, main or auxiliary, supports carrier aggregation of two different frequency bands at the same time.

In a further non-limiting embodiment, only one of capacitors 410− and 410+ is used and the other eliminated in order to save cost, while still maintaining the tuning capability of the remaining RF energy choking tank circuit.

The combined tuning of capacitors 410−, 410+ and 420 can also be utilized to reduce RF transmission harmonics (i.e. by allowing harmonic RF leakage to ground) while optimizing transmission power (i.e. by preventing the main transmission RF energy from leaking), thereby reducing potential harmonic emissions and interference to other radios, such as a WLAN 2.4 GHZ receiver within the device 101.

The RF choking behavior of the parallel-resonating tank circuits comprising choke 201−/capacitor 410− and choke 201+/capacitor 410+ can also be used to block digital noise and the harmonics in the audio signal from reaching the speaker 132 and, via coupling, the antenna 115, that can otherwise lead to the cell band receiver becoming de-sensed or subject to interference by the harmonics.

Figure 5:
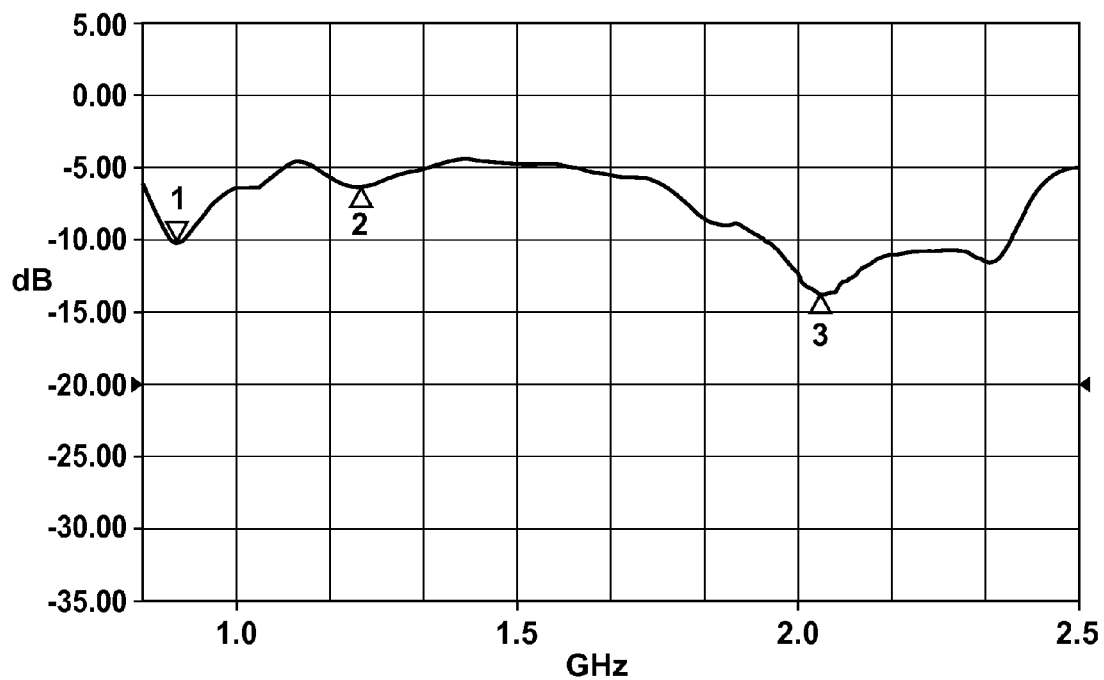
FIG. 5 depicts a return-loss curve of the tunable RF choke circuit of FIG. 3, with a 3 pF tunable capacitor in parallel with an 85 nH inductor, according to non-limiting implementations.

FIG. 5 is a return-loss diagram showing for an implementation wherein each RF choke comprises an 85 nH inductor and capacitor 410+ is tuned to 3 pF, showing different return loss of the antenna with −13.54 dB at around 2 GHz (marker 3 in FIG. 5), −10.26 dB around 762.8 MHz (marker 1) and −6.29 dB around 1.117 GHz (marker 2). In this implementation, the capacitance of capacitor 420 can vary from 0.5 to about 6 pF, depending on speaker module design and the frequency of interest to be tuned to. The capacitances of capacitors 410− and 410+ can also vary from 0.5 to about 6 pF for some specific choking frequencies. The ranges of capacitance are limited by each PITC design.

Figure 6:
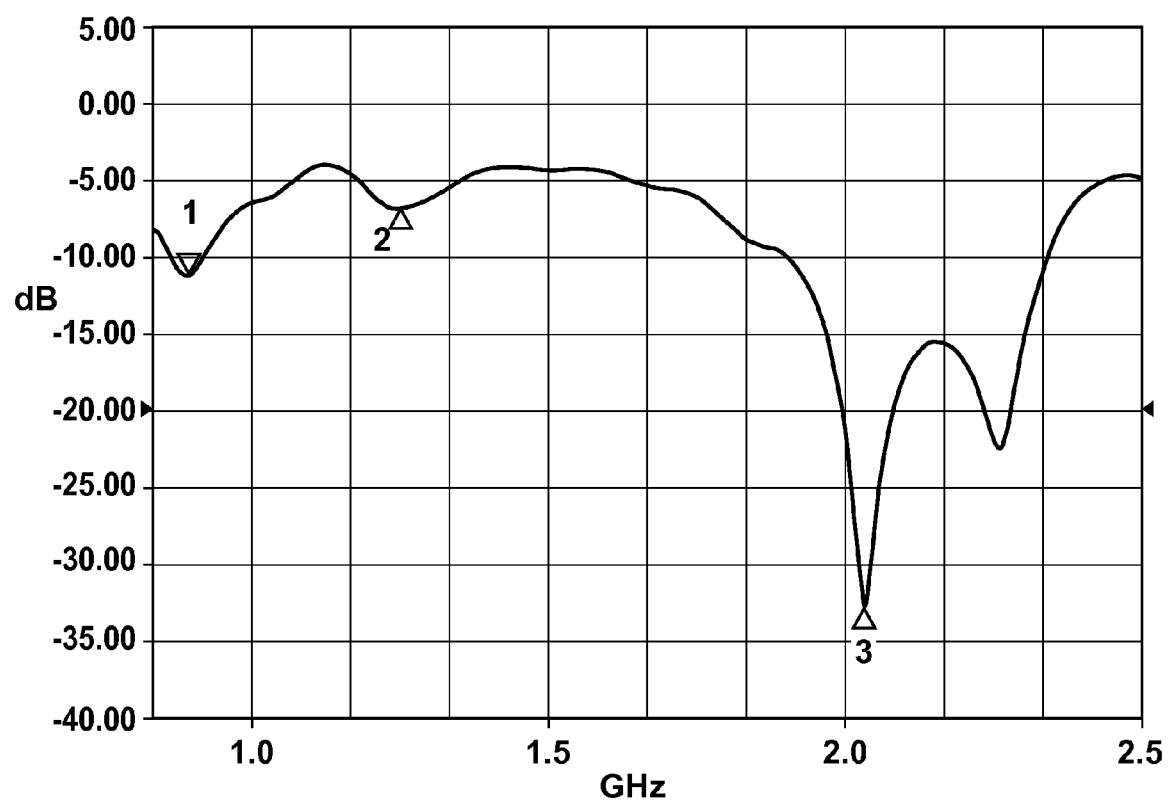
FIG. 6 depicts a return-loss curve of the tunable RF choke circuit of FIG. 3, with at least an 8 pF tunable capacitor in parallel with an 85 nH inductor, according to non-limiting implementations.

FIG. 6 is a return-loss diagram showing for an implementation wherein each RF choke comprises an 85 uH inductor and capacitor 410+ tuned to 8 pF, resulting in relative low impedance across choke 201+, showing significant difference of antenna return loss across broad frequency band with −32.74 dB at around 2 GHz (marker 3), −11.33 dB around 757.4 MHz (marker 1) and −6.84 dB around 1.146 GHz (marker 2), where both of capacitors 420 and 410− are omitted.

Persons skilled in the art will appreciate that there are yet more alternative implementations and modifications possible, and that the above examples are only illustrations of one or more implementations. For example, the principle of tuning the capacitors to adjust the resonance frequency of the loudspeaker coil and the tank circuits connected to speaker 132 can also be applied to adjusting the resonance frequency of the antenna-side inductor 260. The scope, therefore, is only to be limited by the claims appended here.

What is claimed is:

1. A mobile electronic device comprising:
a chassis including a ground plane;
a processor carried by the chassis;
a frequency tunable antenna carried by the chassis and fed by an inductor;
a communications interface carried by the chassis and operative with the processor for receiving and transmitting RF signals via the frequency tunable antenna;
audio circuitry carried by the chassis and operative with the communications interface and processor;
an audio transducer having a coil in proximity to the frequency tunable antenna for at least one of receiving and transmitting audio signals from and to the audio circuitry;
at least one RF choke configured for blocking RF energy from the frequency tunable antenna through the audio transducer to the ground plane and decoupling the antenna from the audio transducer to minimize any detuning of antenna impedance match and degradation in antenna gain; and
at least one tunable capacitor connected in parallel with at least one of the audio transducer coil, the RF choke and the inductor, for providing dynamic RF energy blocking over an operating frequency range of the frequency tunable antenna;
wherein a first tunable capacitor of said at least one tunable capacitor is connected in parallel with a first RF choke of said at least one RF choke forming a first tank circuit in series with the audio transducer, and a second tunable capacitor of said at least one tunable capacitor is connected in parallel with a second RF choke of said at least one RF choke forming a second tank circuit in series with the audio transducer.

2. The mobile electronic device of claim 1, wherein the at least one tunable capacitor is a passive tunable integrated circuit whose capacitance is controlled by the communications interface under control of the processor based on the operating frequency range of the frequency tunable antenna.

3. The mobile electronic device of claim 1, wherein a third tunable capacitor of said at least one tunable capacitor is connected in parallel with the audio transducer coil for tuning the coil so that it does not resonate at RF frequencies, thereby reducing RF energy coupled to the audio transducer.

4. A method of operating the mobile electronic device of claim 3, comprising tuning the first, second and third tunable capacitor to reduce RF transmission harmonics while optimizing transmission power.

5. A method of operating the mobile electronic device of claim 3, comprising tuning the first, second and third tunable capacitor to block digital noise and harmonics in the audio signals from reaching the audio transducer and from being coupled to the frequency tunable antenna.

6. The mobile electronic device of claim 1, wherein said first and second tunable capacitors are each tuned to the same capacitance so that the self-resonating frequencies of the first and second tank circuits are the same, for optimal performance in a selected frequency range of the frequency tunable antenna.

7. The mobile electronic device of claim 1, further comprising an auxiliary antenna for receiving and transmitting RF signals using carrier aggregation, and wherein said first and second tunable capacitors are each tuned to a different capacitance so that the self-resonating frequencies of the first and second tank circuits match self-resonant frequencies of the frequency tunable antenna and the auxiliary antenna operating in different frequency bands.

8. The mobile electronic device of claim 1, wherein the audio transducer is a speaker.

9. The mobile electronic device of claim 1, wherein each of the at least one RF choke comprises an 85 nH inductor in series with the audio transducer and the first tuneable capacitor of the at least one tunable capacitor is tuned to 3 pF, resulting in a return-loss for the frequency tunable antenna characterized by approximately −13.54 dB at around 2 GHz, −10.3 dB around 762.8 MHz and −6.29 dB around 1.117 GHz.

10. The mobile electronic device of claim 1, wherein each of the at least one RF choke comprises an 85 µH inductor in series with the audio transducer and the first tuneable capacitor of the at least one tunable capacitor is tuned to at least 8 pF, resulting in a return-loss for the frequency tunable antenna characterized by approximately −32.74 dB at around 2 GHz, −11.33 dB around 757.4 MHz and −6.84 dB around 1.146 GHz.

11. The mobile electronic device of claim 1, wherein the audio circuitry comprises a Class-D audio amplifier.

12. The mobile electronic device of claim 11, further including a pair of RF bypass capacitors connected to the outputs of the Class-D audio amplifier for reducing digital noise and harmonics in the audio signals.

13. The mobile electronic device of claim 11 further including a pair of ESD diodes connected to the outputs of the Class-D audio amplifier for protecting the Class-D audio amplifier from being damaged by electrostatic discharge.

14. A method of operating the mobile electronic device of claim 1, comprising tuning the at least one tunable capacitor for filtering RF energy at around 2 GHz.

15. A mobile electronic device comprising:
a chassis including a ground plane;
a processor carried by the chassis;
a frequency tunable antenna carried by the chassis and fed by an inductor;
a communications interface carried by the chassis and operative with the processor for receiving and transmitting RF signals via the frequency tunable antenna;
audio circuitry carried by the chassis and operative with the communications interface and processor;
an audio transducer having a coil in proximity to the frequency tunable antenna for at least one of receiving and transmitting audio signals from and to the audio circuitry;
at least one RF choke configured for blocking RF energy from the frequency tunable antenna through the audio transducer to the around plane and decoupling the antenna from the audio transducer to minimize any detuning of antenna impedance match and degradation in antenna gain; and
at least one tunable capacitor connected in parallel with at least one of the audio transducer coil, the RF choke and the inductor, for providing dynamic RF energy blocking over an operating frequency range of the frequency tunable antenna;
wherein a first tunable capacitor of said at least one tunable capacitor is connected in parallel with the audio transducer coil, a second tunable capacitor of said at least one tunable capacitor is connected in parallel with a first RF choke of said at least one RF choke forming a first tank circuit in series with the audio transducer, and a third tunable capacitor of said at least one tunable capacitor is connected in parallel with a second RF choke of said at least one RF choke forming a second tank circuit in series with the audio transducer.

16. The mobile electronic device of claim 15, wherein the at least one tunable capacitor is a passive tunable integrated circuit whose capacitance is controlled by the communications interface under control of the processor based on the operating frequency range of the frequency tunable antenna.

17. The mobile electronic device of claim 15, wherein each of the at least one RF choke comprises an 85 nH inductor in series with the audio transducer and the second tunable capacitor is tuned to 3 pF, resulting in a return-loss for the frequency tunable antenna characterized by approximately −13.54 dB at around 2 GHz, −10.3 dB around 762.8 MHz and −6.29 dB around 1.117 GHz.

18. The mobile electronic device of claim 15, wherein each of the at least one RF choke comprises an 85 µH inductor in series with the audio transducer and the second tunable capacitor is tuned to at least 8 pF, resulting in a return-loss for the frequency tunable antenna characterized by approximately −32.74 dB at around 2 GHz, −11.33 dB around 757.4 MHz and −6.84 dB around 1.146 GHz.

19. The mobile electronic device of claim 15, wherein the audio circuitry comprises a Class-D audio amplifier and wherein the mobile electronic device further includes a pair of RF bypass capacitors connected to the outputs of the Class-D audio amplifier for reducing digital noise and harmonics in the audio signals.

20. The mobile electronic device of claim 15 wherein the audio circuitry comprises a Class-D audio amplifier and wherein the mobile electronic device further includes a pair of ESD diodes connected to the outputs of the Class-D audio amplifier for protecting the Class-D audio amplifier from being damaged by electrostatic discharge.

* * * * *